(12) United States Patent
Mahowald et al.

(10) Patent No.: US 7,750,282 B2
(45) Date of Patent: Jul. 6, 2010

(54) DUAL PURPOSE AMBIENT LIGHT SENSOR

(75) Inventors: Peter H. Mahowald, Los Altos, CA (US); Jose N. Martinez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/124,630

(22) Filed: May 21, 2008

(65) Prior Publication Data

US 2009/0289175 A1 Nov. 26, 2009

(51) Int. Cl.
*G01J 1/44* (2006.01)
*H05B 37/02* (2006.01)
*H05B 39/04* (2006.01)

(52) U.S. Cl. .................. 250/214 AL; 345/102; 345/207

(58) Field of Classification Search ........... 250/214 AL, 250/214.1, 214 R, 227.11, 208.2, 205, 214 B; 340/691.1, 815.45; 345/156, 102, 157, 168–173, 345/207, 901–905
See application file for complete search history.

(56) References Cited

U.S. PATENT DOCUMENTS

| | | | | |
|---|---|---|---|---|
| 7,236,154 | B1 * | 6/2007 | Kerr et al. | 345/102 |
| 2003/0043589 | A1 * | 3/2003 | Blank | 362/494 |
| 2004/0195494 | A1 * | 10/2004 | Kok et al. | 250/214 AL |
| 2004/0204190 | A1 * | 10/2004 | Dietrich et al. | 455/575.1 |
| 2006/0033443 | A1 | 2/2006 | Ishii et al. | |
| 2007/0090962 | A1 * | 4/2007 | Price et al. | 340/691.1 |
| 2008/0111500 | A1 | 5/2008 | Hoover et al. | |

FOREIGN PATENT DOCUMENTS

| | | |
|---|---|---|
| JP | 04212289 | 8/1992 |
| JP | 04324294 | 11/1992 |
| JP | 05238309 | 9/1993 |
| JP | 06251889 | 9/1994 |
| JP | 06318050 | 11/1994 |
| JP | 07014694 | 1/1995 |
| JP | 10073865 | 3/1998 |
| JP | 2000098942 | 4/2000 |
| JP | 2005032470 | 2/2005 |
| JP | 2005293853 | 10/2005 |
| JP | 2006041043 | 2/2006 |

OTHER PUBLICATIONS

Pending U.S. Appl. No. 12/475,993, filed Jun. 1, 2009, Pance et al.

(Continued)

*Primary Examiner*—Georgia Y Epps
*Assistant Examiner*—Francis M Legasse, Jr
(74) *Attorney, Agent, or Firm*—Dorsey & Whitney LLP

(57) ABSTRACT

A dual purpose ambient light sensor. More particularly, an ambient light sensor may be provided on an electronic device to aid in controlling the brightness of the illuminators of the device. The ambient light sensor may be mounted in such a way as to detect ambient light when the electronic device is opened or closed so that the device may control the brightness of the illuminators of the device, whether the illuminators are mounted on the outer or inner shell of the device. Further, when the display is closed, the sensitivity of the ambient light sensor may be adjusted appropriately to account for the lesser amount of light that may reach the sensor. Finally, a spacer or light pipe may be provided to allow ambient light to reach the sensor to provide an accurate ambient light reading when the device is in the closed position.

20 Claims, 7 Drawing Sheets

OTHER PUBLICATIONS

Pending U.S. Appl. No. 12/476,000, filed Jun. 1, 2009, Pance et al.
Pending U.S. Appl. No. 12/476,040, filed Jun. 1, 2009, Pance et al.
Pending U.S. Appl. No. 12/476,067, filed Jun. 1, 2009, Pance et al.
Pending U.S. Appl. No. 12/495,230, filed Jun. 30, 2009, Pance et al.
Pending U.S. Appl. No. 12/495,353, filed Jun. 30, 2009, Pance et al.

* cited by examiner

DUAL PURPOSE AMBIENT LIGHT SENSOR

TECHNICAL FIELD

This invention relates generally to ambient light sensors in electronic devices, and more specifically to methods and apparatus for a dual purpose ambient light sensor that aids in controlling the brightness of illuminators of the electronic device whether the device is in the open or closed position.

BACKGROUND

Many portable electronic devices contain ambient light sensors to sense ambient light of the area surrounding the electronic device. The output of these sensors may be utilized by the device to control the brightness of the backlighting of a display or keyboard in response to ambient light. For example, the device may use the ambient light detected by an ambient light sensor to adjust the brightness of an LCD screen of a laptop computer to maintain a relatively uniform appearance under all lighting conditions, from darkness to direct sunlight. Adjusting the brightness of the backlighting of an electronic device may also save battery power, as backlighting often consumes large amounts of battery power. Thus, dimming the backlights of an electronic device may offer both power savings and uniform appearance.

The output of the ambient light sensor may also be utilized to control certain lights or luminance effects associated with an electronic device other than the backlighting. For example, many electronic devices contain indicator lights that provide to the user information about the device, such as the operating status. However, in lowlight environments such as a dark room, indicator lights may appear very bright if the luminance of the lights are not adjusting based on the ambient light in the room. Thus, an ambient light sensor may also be located on the outer shell of the electronic device to measure the ambient light and aid in controlling the indicator lights of the outer shell accordingly when the electronic device is in the closed position.

Generally, the best place for locating an ambient light sensor on an electronic device is near the illuminator being controlled (e.g. the display or indicator lights) and facing the direction where the ambient light originates. This allows the ambient light sensor to accurately sense the ambient light of the room or surrounding area in order to allow the device to adjust the brightness of the illuminator accordingly. For example, an ambient light sensor utilized in controlling an LCD screen of a laptop computer may be placed on the bezel of the computer, facing the user. This position would provide the optimal location for the ambient light sensor to detect the amount of ambient light falling on the display such that the device may control the brightness of the LCD screen accordingly.

Similarly, the best place to locate an ambient light sensor associated with controlling illuminators located on the outer shell of an electronic device would be next the illuminators on the outer shell. This allows the ambient light sensor to accurately sense the ambient light of the room or surrounding area in order to allow the device to adjust the brightness of the illuminators located on the outer shell of the device accordingly.

SUMMARY

As described above, many ambient light sensors that control a screen display of an electronic device are located near the screen facing the direction where the ambient light originates. However, when the electronic device is in the closed position, an ambient light sensor located near the screen may no longer detect ambient light. Thus, controlling illuminators located on the outer shell of an electronic device may require a second ambient light sensor located on the outer shell of the electronic device. Thus, what is needed is a single ambient light sensor that accurately detects ambient light such that an electronic device may control the brightness of the illuminators of the device accordingly, and in particular when the device is in both the open and closed positions.

One embodiment may take the form of an apparatus for controlling the brightness of a plurality of illuminators of an electronic device. The electronic device of the embodiment may be configured to move between an open position and a closed position. Further, the apparatus may comprise an ambient light sensor and a control circuit. The control circuit may be operative to receive an output from the ambient light sensor and configured to control the brightness of a first illuminator when the electronic device is in the open position. The control circuit may be further configured to control the brightness of a second illuminator when the electronic device is in the closed position.

Another embodiment may take the form of a method for controlling the brightness of at least one illuminator of an electronic device. The electronic device of the second embodiment may be configured to provide an open position and a closed position. Further, the method may comprise sensing ambient light using an ambient light sensor and using the output of the ambient light sensor to control the brightness of the at least one illuminator when the electronic device is in the open position. The method may further comprise providing a path for at least some ambient light to reach the ambient light sensor when the electronic device is in the closed position and adjusting the sensitivity of the ambient light sensor when the electronic device is in the closed position.

Yet another embodiment may take the form of a computer system configured to provide an open position and a closed position. The computer system may comprise a display located on an inner surface of the computer system, at least a first illuminator located on an outer surface of the computer system and an ambient light sensor configured to control the brightness of the display and the brightness of the first illuminator.

DETAILED DESCRIPTION OF THE INVENTION

One particular implementation conforming to aspects of the present invention takes the form an electrical device incorporating an ambient light sensor. The embodiment may allow the ambient light sensor to measure ambient light when the electronic device is in both an open and closed position. Accordingly, the ambient light sensor may thus be referred to as a "dual purpose" ambient light sensor.

More particularly, the aforementioned embodiment or a method may provide for the ambient light sensor to be placed near an edge of the electronic device. In this manner, the sensor may continue to detect the ambient light present when the electronic device is in the closed position as well as in the open position. To further accommodate the ambient light sensor detecting the present ambient light in the closed position, a spacer or light pipe-type device may be provided to enhance the amount of ambient light reaching the ambient light sensor.

Another embodiment may adjust the sensitivity of the ambient light sensor when the electronic device is in a particular position, such as a closed position. By adjusting the sensitivity of the sensor, the implementation may account for a lesser amount of ambient light reaching the sensor when the electronic device is in the closed position. In this manner, the electronic device may use the output provided by the ambient light sensor to adjust the brightness of the illuminators when the device is in both the open and closed positions without requiring a second sensor on the outer shell.

Figure 1:
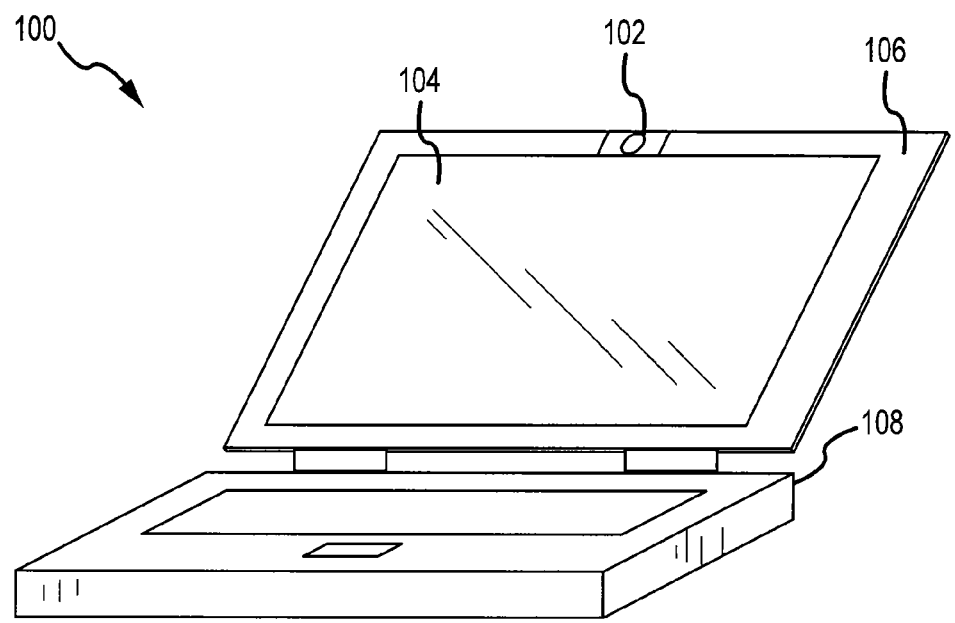
FIG. 1 depicts an isometric view of an exemplary laptop or notebook computer in an open configuration with an ambient light sensor located on the bezel of the display screen.

FIG. 1 depicts an exemplary laptop or notebook computer in an open configuration with an ambient light sensor located on the bezel of the display screen. It should be noted that the computer 100 shown in FIG. 1 is depicted as a notebook computer purely for convenience. The computer could be any form of electronic device having an illuminator, such as a desktop computer, handheld computing device, personal digital assistant, mobile telephone, music or audio player (such as an MP3 player), health or medical device, auto/vehicle-mounted device, and so on. Accordingly, a "computer," as used generally herein, encompasses all such devices and any other electronic device having, or consisting of, an illuminated display, status light, illuminating indicator, backlight or other light-emitting element capable of emitting light at least at two levels.

The notebook computer 100 may also include an ambient light sensor (ALS) 102 generally operative to detect ambient light and aid in controlling the brightness of the illuminators accordingly. As discussed above, it may be generally useful to locate the ALS 102 near the illuminator being controlled and facing the direction where the ambient light originates. Thus, as depicted in FIG. 1, an ALS 102 used to control the display 104 of the computer 100 may be located on the bezel 106 of the display facing the user. An ALS 102 located on the bezel 106 may provide an effective location to more accurately detect ambient light falling on the display and thus aid in controlling the display 104 brightness to account for such ambient light.

In FIG. 1, the ALS 102 is depicted as being located on the top bezel of the notebook. However, it should be appreciated that the ALS 102 may be located anywhere on the bezel surrounding the display 104. For example, the ALS 102 may also be located on either side of the display 104 of the computer 100. Further, the ALS 102 may also be located on the case 108 of the computer 100 in situations where the ALS 102 aids in controlling the backlight to the keyboard of the computer 100 and/or LCD display 104. Further still, for aesthetic reasons, the ALS 102 may be located under a speaker grill located on the case of the computer 100. Generally, the ALS 102 may be located in any position on the computer 100 that allows the ALS 102 to accurately control the brightness of an illuminator to account for the local ambient light.

Figure 2:
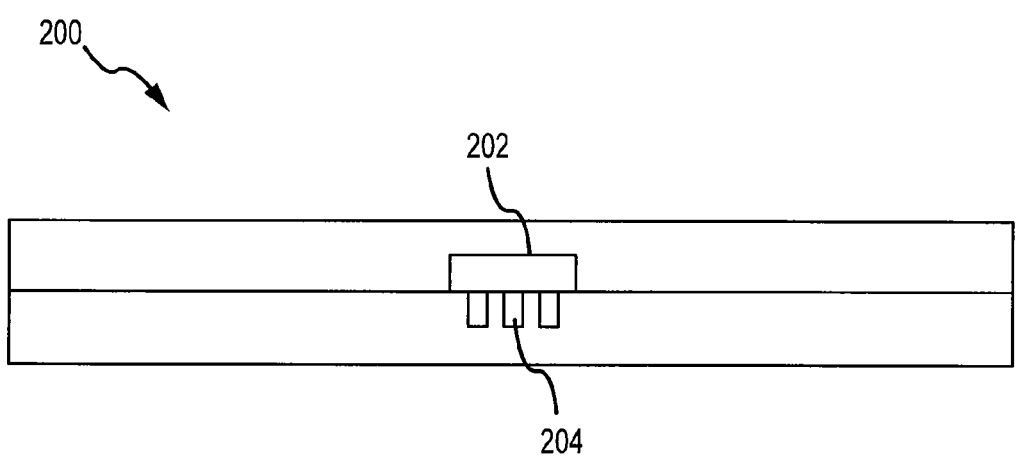
FIG. 2 depicts a front view of the exemplary laptop or notebook computer of FIG. 1 in a closed configuration.

FIG. 2 depicts a front view of the exemplary laptop or notebook computer of FIG. 1 in a closed configuration. In this embodiment, the ALS 102 of FIG. 1 may be located near the edge of the bezel surrounding the display. However, when the computer 200 is in the closed position, the ALS 102 of FIG. 1 may no longer be able to detect ambient light. In such a position, the case of the computer 100 may block ambient light from reaching the ALS 102. Therefore, to control the brightness of a set of indicator lights 204 located on the outer shell of the computer 200, a second ambient light sensor 202 may be needed. This second ambient light sensor 202 may be positioned near the illuminator being controlled and facing the direction where the ambient light originates. In this position, ambient light sensor 202 may aid in controlling the indicator light brightness in response to detected ambient light.

Figure 3A:
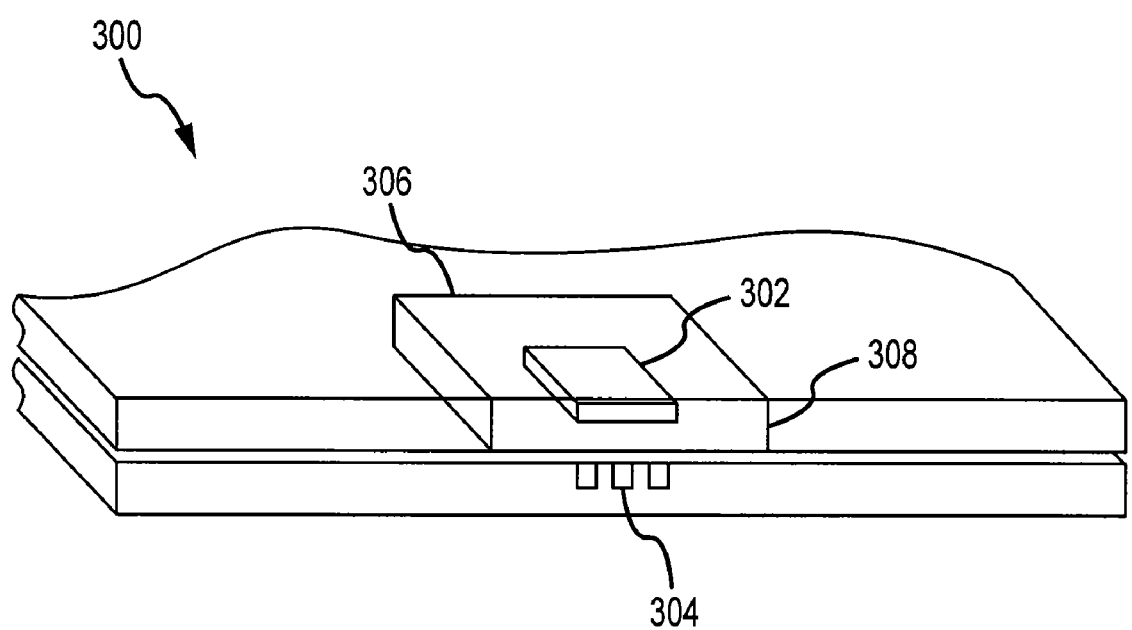
FIG. 3a depicts an isometric view of a first embodiment illustrating an exemplary laptop or notebook computer in a closed configuration with a translucent window providing a path for ambient light to reach an ambient light sensor.

FIG. 3a depicts an isometric view of a first embodiment illustrating an exemplary laptop or notebook computer in a closed configuration with a translucent window providing a path for present ambient light to reach an ambient light sensor. In FIG. 3a, a notebook or laptop computer 300 is shown in the closed position. An ALS 302 may be located near the front edge of the computer 300. The ALS 302 may be utilized to control the brightness of the various illuminators of the computer 300. For example, the ALS 302 may control the brightness of the display of the computer 300 when the computer is in the open position. The ALS 302 may also control the indicator lights 304 located on the outer edge of the computer 300. For the ALS 302 to accurately control the brightness of the illuminators in response to ambient light, the ALS 302 may be positioned in such a manner as to allow the ALS 302 to detect ambient light in both the open and closed positions. To further facilitate the capability of the ALS 302 to detect ambient light when the computer 300 is in the closed position, a translucent window 306 may surround the ALS 302 to provide a path for ambient light to reach the ALS 302.

The translucent window 306 of FIG. 3 may be box-like in shape and surround the ALS 302. The translucent window 306 may further abut the front edge of the computer 300 and extend away from the front edge. The translucent window 306 may thus form a see-through box that surrounds the ALS 302 and exposes the ALS 302 to ambient light. Because the translucent window 306 may be made from a translucent or clear material, ambient light may enter the translucent window 306 such that the ALS 302 may detect ambient light. By providing a path for ambient light to reach the ALS 302, the ALS 302 may control the illuminators of the computer 300 when the computer is in both the open and closed configurations.

However, as discussed above, the optimal position for an ALS is typically near the illuminator being controlled and facing the same direction as the illuminator. When the embodiment depicted in FIG. 3a is in the open position, the ALS 302 faces the user. However, when the embodiment depicted in FIG. 3 is in the closed position, the ALS 302 faces the bottom half of the computer 300. Therefore, the ALS 302 may not be located in the optimal position to detect and aid in the control of the indicator lights 304 of the computer 300.

Because less ambient light may reach the ALS 302 when the computer 300 is in the closed position, the sensitivity of the ALS 302 may be adjusted to account for the less-than-optimal position of the ALS 302. The adjustment of the sensitivity of the ALS 302 may be explained in more detail below in FIG. 6.

As stated above, the translucent window 306 may surround the ALS 302 to provide a path for ambient light to reach the ALS 302 when the computer 300 is in the closed position. However, it is not required that the translucent window 306 surround the ALS 302. The translucent window 306 may be constructed in any manner that allows ambient light to reach the ALS 302 such that the ALS 302 can detect ambient light when the computer 300 is both open and closed. For example, the translucent window 306 may be constructed as a series of reflectors that reflect ambient light to the ALS 302. Further, the translucent window 306 may be constructed of any material that would allow ambient light to pass through the window, including, but not limited to, a clear plastic or glass. In general, the translucent window 306 may be constructed in such a way and of such a material that a path is provided for ambient light to reach the ALS 302, such that the ALS 302 may detect ambient light.

Figure 3B:
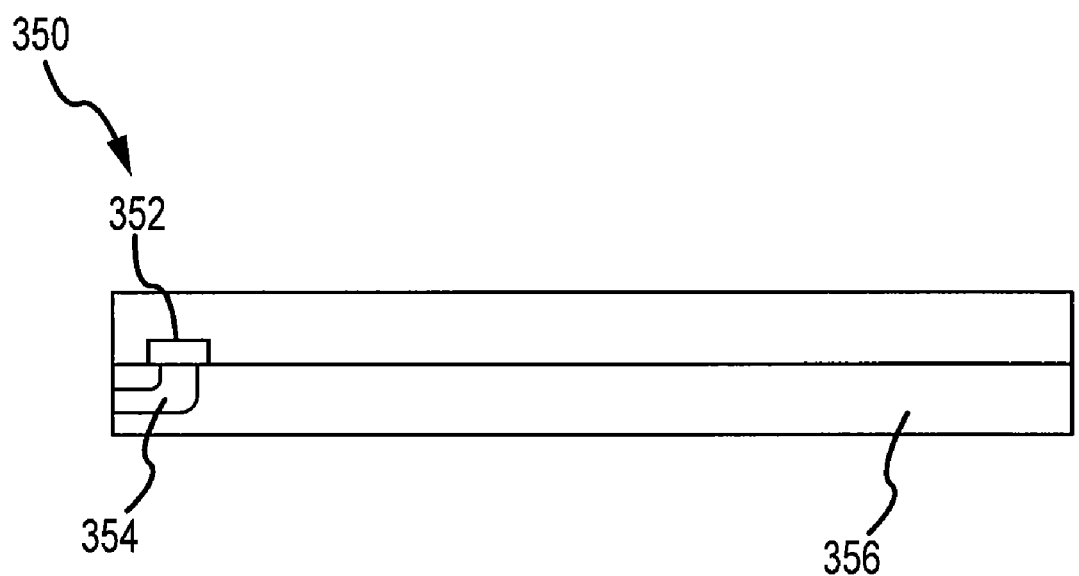
FIG. 3b depicts a cross-section view of a second embodiment illustrating an exemplary laptop or notebook computer in a closed configuration with a light pipe providing a path for ambient light to reach an ambient light sensor.

FIG. 3b depicts a cross-section view of a second embodiment illustrating an exemplary laptop or notebook computer in a closed configuration with a light pipe or wave guide providing a path for ambient light to reach an ambient light sensor. In FIG. 3b, a notebook or laptop computer 350 is shown in the closed position. An ALS 352 may be located near the front edge of the computer 350. The ALS 352 may be utilized to control the brightness of the various illuminators of the computer 350. To facilitate the capability of a single ALS 352 to detect ambient light when the computer 350 is in the closed position, a light pipe 354 may provide a path for ambient light to reach the ALS 352.

A light pipe, or wave guide, is a pipe or tube that transports light to another location with minimal light loss. In FIG. 3b, the light pipe 354 may be located within the bottom piece 356 of the computer 350 abutting the front edge of the computer 350 case. The light pipe 354 may extend horizontally away from the front edge of the computer 350. The light pipe 354 may also bend 90 degrees and extend vertically, terminating directly below the ALS 352. It should be noted that the angle or bend in the light pipe may vary in alternative embodiments and may be any angle necessary to transmit at least some light to the ALS. The light pipe 354 may be constructed of any material that propagates ambient light with minimal loss, such as a fiber optic cable. For example, the light pipe 354 may be constructed of optical fiber or an optical lighting film. In this embodiment, ambient light may enter the light pipe 354 at the front of the computer 350 and exit the light pipe directly below the ALS 352, providing a path for ambient light to reach the ALS 352 when the computer 350 is in the closed position. Because a path for ambient light to reach the ALS 352 when the computer is in the closed position is provided, the ALS 352 may more accurately detect ambient light and therefore facilitate controlling the illuminators of the computer 350 when the computer is in both the open and closed configurations.

Similar to the embodiment depicted in FIG. 3a, when this embodiment is in the closed position, the ALS 354 may detect less ambient light than may be detected by the ALS when the embodiment is in an open position. Therefore, the sensitivity of the ALS 354 may be adjusted to account for the possibility that the ALS 354 may be detecting less ambient light. The adjustment of the sensitivity of the ALS 354 may be explained in more detail below in FIG. 6.

Figure 4:
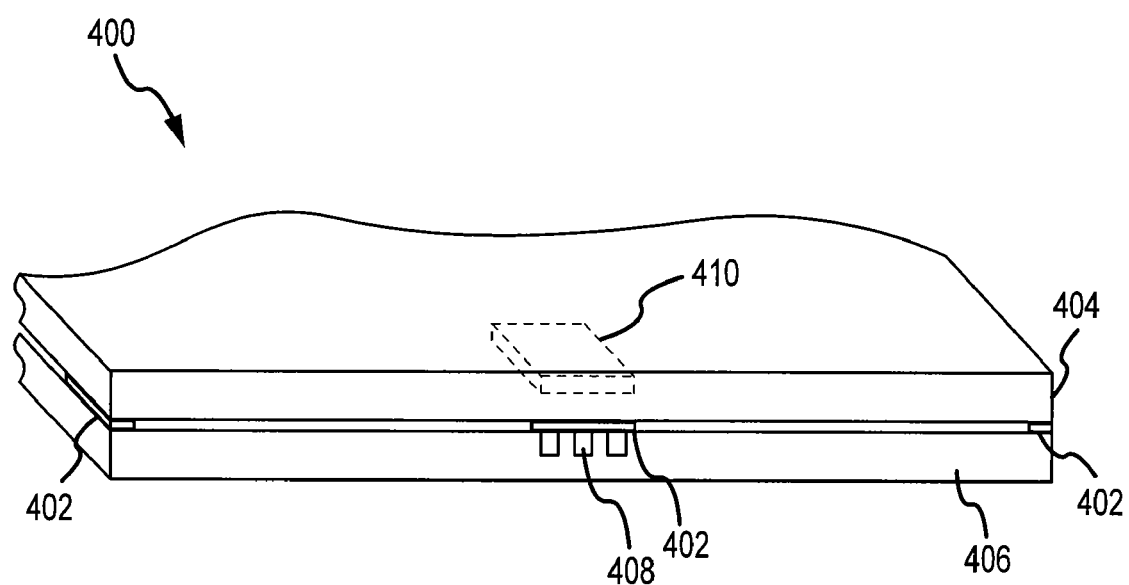
FIG. 4 depicts an isometric view of a third embodiment illustrating an exemplary laptop or notebook computer in a closed configuration with spacers providing a path for present ambient light to reach an ambient light sensor.

FIG. 4 depicts an isometric view of a third embodiment illustrating an exemplary laptop or notebook computer in a closed configuration with spacers providing a path for present ambient light to reach an ambient light sensor. In the embodiment depicted, a notebook or laptop computer 400 is shown in the closed position. Also depicted is a series of spacers 402 located between the top piece 404 and the bottom piece 406 of the computer 400.

Similar to the embodiment of FIG. 1, the present embodiment may include an ALS 410 located on the bezel surrounding the display of computer 400. However, because the computer 400 is depicted in the closed position, the ALS 410 located on the bezel surrounding the display is shown in phantom. Nonetheless, the ALS 410 may be utilized to control the brightness of the illuminators of the computer 400. For example, similar to the embodiment shown in FIG. 1, the ALS 410 may control the brightness of the display of the computer 400 when the computer is in the open position. The ALS 410 may also control indicator lights 408 located on the outer edge of the computer 400. For the ALS 410 to accurately control the brightness of the illuminators in response to the present ambient light, the ALS 410 may be positioned to allow the ALS 410 to detect ambient light in both the open and closed positions. To further facilitate the capability of the ALS 410 to detect ambient light when the computer 400 is in the closed position, spacers 402 may be provided to bias the computer 400 slightly open, thereby allowing at least some ambient light to reach the ALS 410. To bias the computer 400 slightly open, spacers 402 may placed between the top piece 404 of the computer and the bottom piece 406 in such a way as to prevent computer 400 from fully closing. Additionally, in some embodiments a mirrored or reflective element may be provided on a surface opposing the ALS when the computer is in the closed position. Such a reflective element may allow more ambient light to reach the ALS by reflecting light entering through the gap defined by the spacer(s) at or into the ALS.

As stated above, spacers 402 may be provided to bias the computer 400 slightly open to allow ambient light to reach the ALS 410. The spacers 402 are depicted in FIG. 4 as being located between the top piece 404 and the bottom piece 406 of the computer 400 at the corners and above the indicator lights 408. However, the spacers 402 may be located anywhere between the top piece 404 and the bottom piece 406 of the computer 400. For example, the spacers 402 may be located near the hinges of the computer 400. Further, the spacers 402 may be affixed to either the top piece 404 or the bottom piece 406 of the computer 400, or some spacers may be affixed to the top piece 404 while other spacers are affixed to the bottom piece 406. Generally, the spacers 402 may take any form that biases the top piece 404 and the bottom piece 406 of the computer 400 in a slightly open position such that an ALS located on the computer is capable of detecting ambient light in both the open and closed positions. In the embodiment depicted in FIG. 4, the spacers 402 may be plastic or rubber box-like structures placed between the top piece 404 and the bottom piece 406. However, as mentioned above, the spacers 402 may be constructed of any material and be of any shape such that the spacers bias the computer 400 in a slightly open position. By biasing the computer 400 in a slightly open position, ambient light may be allowed to enter the computer 400 between the top piece 404 and the bottom piece 406 and may be detected by an ALS.

Similar to the embodiment depicted in FIG. 3, when this embodiment is in the closed position, the ALS 410 faces the bottom piece 406 of the computer 400. Therefore, the ALS 410 is not located in the optimal position to detect and aid in the control of the indicator lights 404 of the computer 400.

Because less ambient light may reach the ALS 410 when the computer 400 is in the closed position, the sensitivity of the ALS 410 may be adjusted to account for the less-than-optimal position of the ALS 410. The adjustment of the sensitivity of the ALS 410 may be explained in more detail below in FIG. 6.

Figure 5:
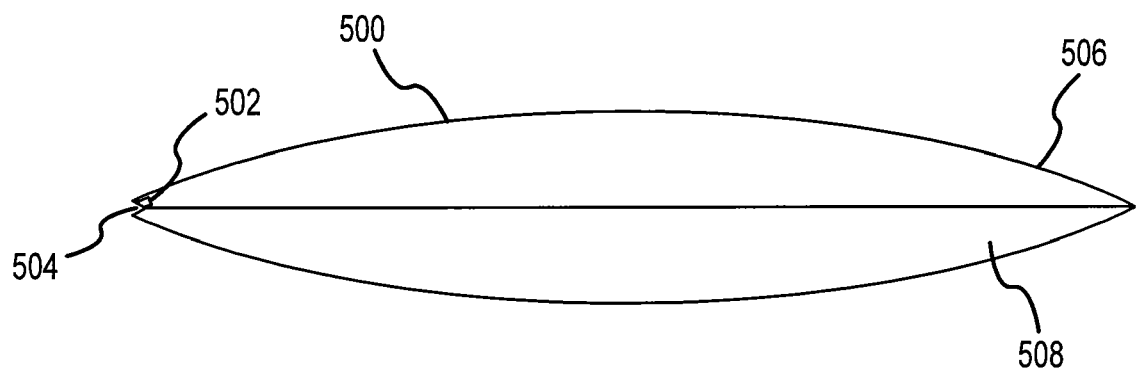
FIG. 5 depicts a side view of a fourth embodiment illustrating a laptop design that allows present ambient light to reach an ambient light sensor when the laptop is in both an open and closed position.

FIG. 5 depicts a side view of a fourth embodiment taking the form of a computer design. The present embodiment allows at least some ambient light to reach an ambient light sensor when the laptop is in both an open and closed position. In the embodiment depicted, a notebook or laptop computer 500 is shown in the closed position. An ALS 502 may be located such that it may be utilized to control the brightness of the illuminators of the computer 500. For example, the ALS 502 may control the brightness of the display of the computer 500 when the computer is in the open position. The ALS 502 may also control indicator lights located on the outer edge of the computer 500. For the ALS 502 to more accurately control the brightness of the illuminators in response to the ambient light detected, the ALS 502 may be positioned in such a manner as to allow the ALS 502 to detect the present ambient light in both the open and closed positions. To further facilitate the capability of the ALS 502 to detect ambient light when the computer 500 is in the closed position, the computer 500 may be constructed in such a manner as to provide a path for ambient light to reach the ALS 502.

For example and as depicted in FIG. 5, the computer 500 may be constructed in a clamshell shape. At the front end of computer 500, a notch 504 may be cut into the clamshell such that, at one end of the clamshell, the top piece 506 of the computer 500 and the bottom piece 508 do not come into contact. Further, the ALS 502 may be positioned on the top piece 506 within the notch 504. Through the design of the computer 500, the ALS 502 may detect ambient light when the computer 500 is in both the open position and the closed position. In this manner, the ALS 502 may control multiple illuminators located on the computer 500 as well as on the outer shell of the computer 500.

Similar to the embodiments depicted in FIGS. 3 and 4, the sensitivity of the ALS 502 may be adjusted to account for the lesser amount of ambient light that may reach the ALS 502 when the computer is in the closed position. The adjustment of the sensitivity of the ALS 502 may be further explained in more detail below in FIG. 6.

As discussed in FIGS. 1-5, a single ambient light sensor may be provided that controls the brightness of several illuminators of a computer or other electronic device. The ALS may control the illuminators when the electronic device is in both the open and closed positions. However, as explained above, certain configurations allow less ambient light to reach the ALS when the electronic device is in the closed position than when the device is in the open position. Thus, a single ALS may detect less ambient light when the computer is in the closed position when compared to the open position, even though the ambient light of the surrounding area may not have changed. In such circumstances, the sensitivity of the ALS may be adjusted to account for the less ambient light detected by the ALS.

Figure 6:
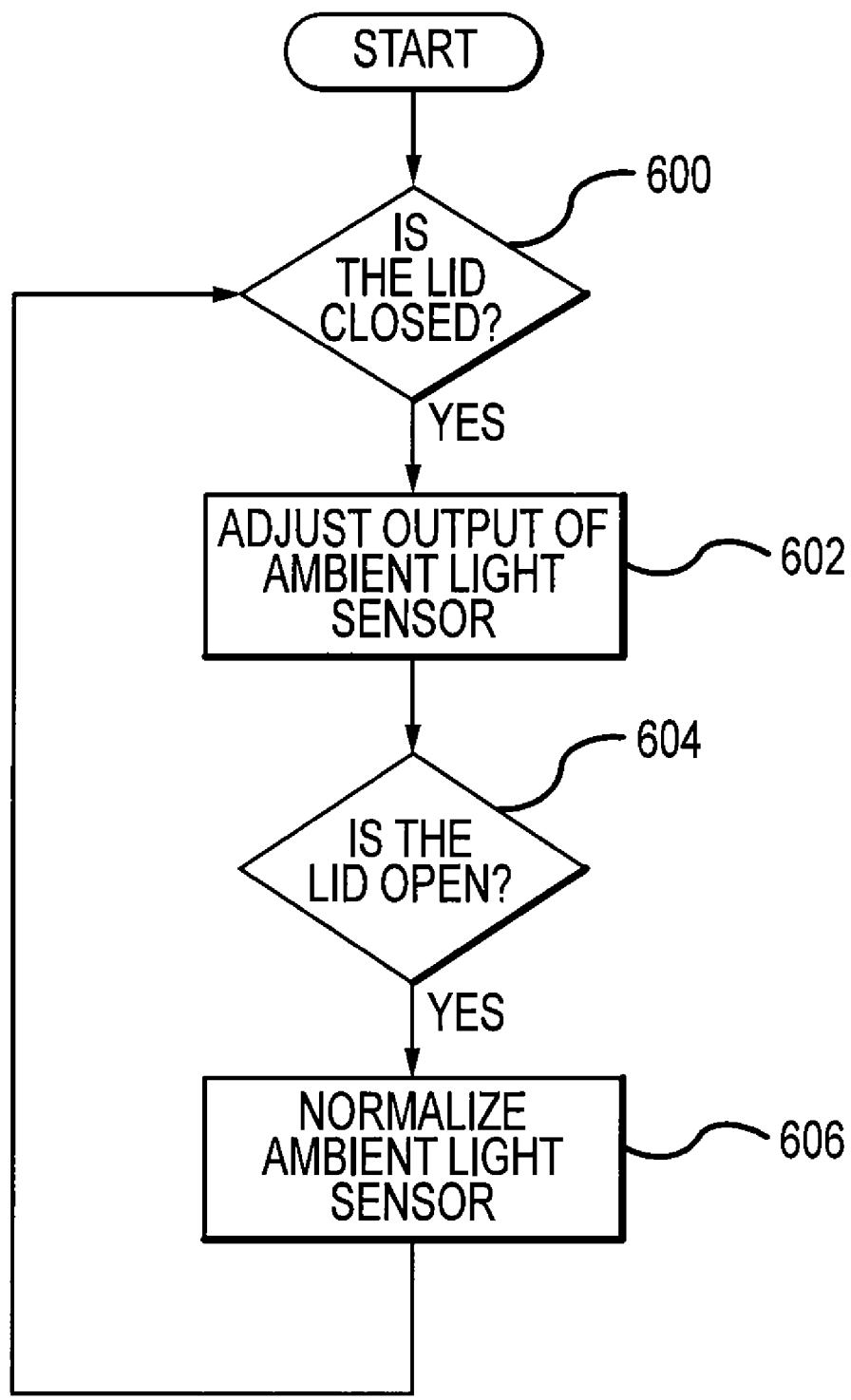
FIG. 6 is a flow chart of a fifth embodiment for adjusting the sensitivity of an ambient light sensor when an electronic device is in a closed position.

FIG. 6 is a flow chart a fifth embodiment for adjusting the sensitivity of an ambient light sensor when an electronic device is in a closed position. In operation 600, the electronic device may monitor to detect which position the device is in. If the embodiment determines that the electronic device is in the closed position, the sensitivity of the ALS may need to be adjusted to account for the less amount of ambient light reaching the ALS.

If the embodiment determines that the lid of the electronic device is in the closed position in operation 600, the sensitivity of the ALS may be adjusted in operation 602. To account for the lesser amount of ambient light reaching the ALS in the closed position, the output of the ALS may be adjusted to increase the sensitivity of the sensor. As described above, an ALS located on the inner face of an electronic device may detect less ambient light when the device is in the closed position when compared to the open position, even though the ambient light in the surrounding area may not have changed. Thus, the sensitivity of the ALS may be increased accordingly.

To adjust the sensitivity of the ALS, one embodiment may simply adjust the output of the ALS. For example, an ALS may aid in adjusting the brightness of an illuminator of an electronic device in response to ambient light. One method of controlling the brightness of an illuminator is to accept the output provided by the ALS and adjust the brightness accordingly. For example, an ALS output ranging from 0-100 units on an arbitrary scale may correspond to a range from no ambient light to direct sunlight. (It should be noted that the range of the arbitrary scale is likewise arbitrary; 0-100 is used solely for convenience.) Thus, the higher the output from ALS, the brighter the illuminator may become. In this configuration, a control circuit of an electronic device may control the brightness of an illuminator based on the ambient light output provided by the ALS. Thus, the control circuit may increase the brightness of an illuminator when the output of the ALS increases. Further, the control circuit may only adjust the brightness of the illuminator for certain intervals of ambient light. For example, the control circuit may only increase the brightness of the illuminator for every 10 units of the arbitrary scale outputted by the ALS. Thus, the brightness of the illuminator may be adjusted when the ALS output reads 10 units, 20 units, 30 units, etc.

When the electronic device is in the closed position, however, the output of the ALS may only range from 0-20 units (indicating no ambient light to direct sunlight) as less ambient light may reach the sensor in this position. Therefore, the sensitivity of the ALS may be adjusted accordingly. In this example, the intervals in which the brightness of the illuminator is adjusted based on the ambient light may be modified. Thus, instead of adjusting the brightness for every 10 units output by the ALS, the control circuit may adjust the brightness for every 2 units output by the ALS. In this manner, the sensitivity of the ALS may be increased to account for the lesser amount of ambient light reaching the ALS. Further, by adjusting the sensitivity of the ALS, a single ALS may more accurately control the brightness of illuminators located on both the inside and outside of the electronic device.

As an alternative, the output of the ALS may be multiplied by a scaling factor to compensate for the reduced ambient light reaching the ALS under certain operating conditions, such as when a lid or top of the computer is closed. In such an embodiment, the intervals, range or outputs of the arbitrary scale that correspond to the brightness levels of the indicator(s) are unchanged. Instead, the embodiment applies the scaling factor to the ALS output to produce a modified output within the same range as a standard, unmodified output.

As one example, presume the ALS may sense or receive only one-fifth as much light when the computer is closed as it may receive when the computer is open. The embodiment may therefore multiply the ALS output by five to produce a modified output falling within the same ranges expected when the computer is open. In this manner, a single scale or range may be used for control of the illuminators. It should be noted that the scaling factor may be empirically determined and need not be linear. The scaling factor may be logarithmic or otherwise change as the ALS output increases or decreases.

As another alternative, the sensitivity of the ALS may be adjusted by adjusting the gain of the sensor. By adjusting the gain of the ALS, the sensor may become more sensitive to smaller external changes in the brightness of the ambient light when the device is in the closed position. Thus, adjusting the gain of the sensor may account for the lesser amount of ambient light that may be detected by the ALS in the closed position.

The sensitivity of the ALS may remain adjusted until the embodiment determines that the lid of the electronic device is opened in operation 604. In this circumstance, the ALS may not need to be adjusted as it may be assumed that the ALS is receiving the ambient light indicative of the ambient light in the surrounding area. Thus, once the embodiment determines that the electronic device is in the open position, the sensitivity of the ALS may be adjusted back to the normal state in operation 606. When the ALS is normalized in this fashion, the output of the ALS may be no longer adjusted as it is assumed that the ALS is receiving direct ambient light. Referring to the previous example, in the normal state (or when the electronic device is in the open position), the ALS output would return to a range of 0-100 units and typically would no longer be adjusted by the embodiment. The above process may be repeated as the lid of the electronic device is opened and closed during use, thereby adjusting the sensitivity of the ALS accordingly, e.g., the return arrow from operation 606 to operation 600.

Figure 7:
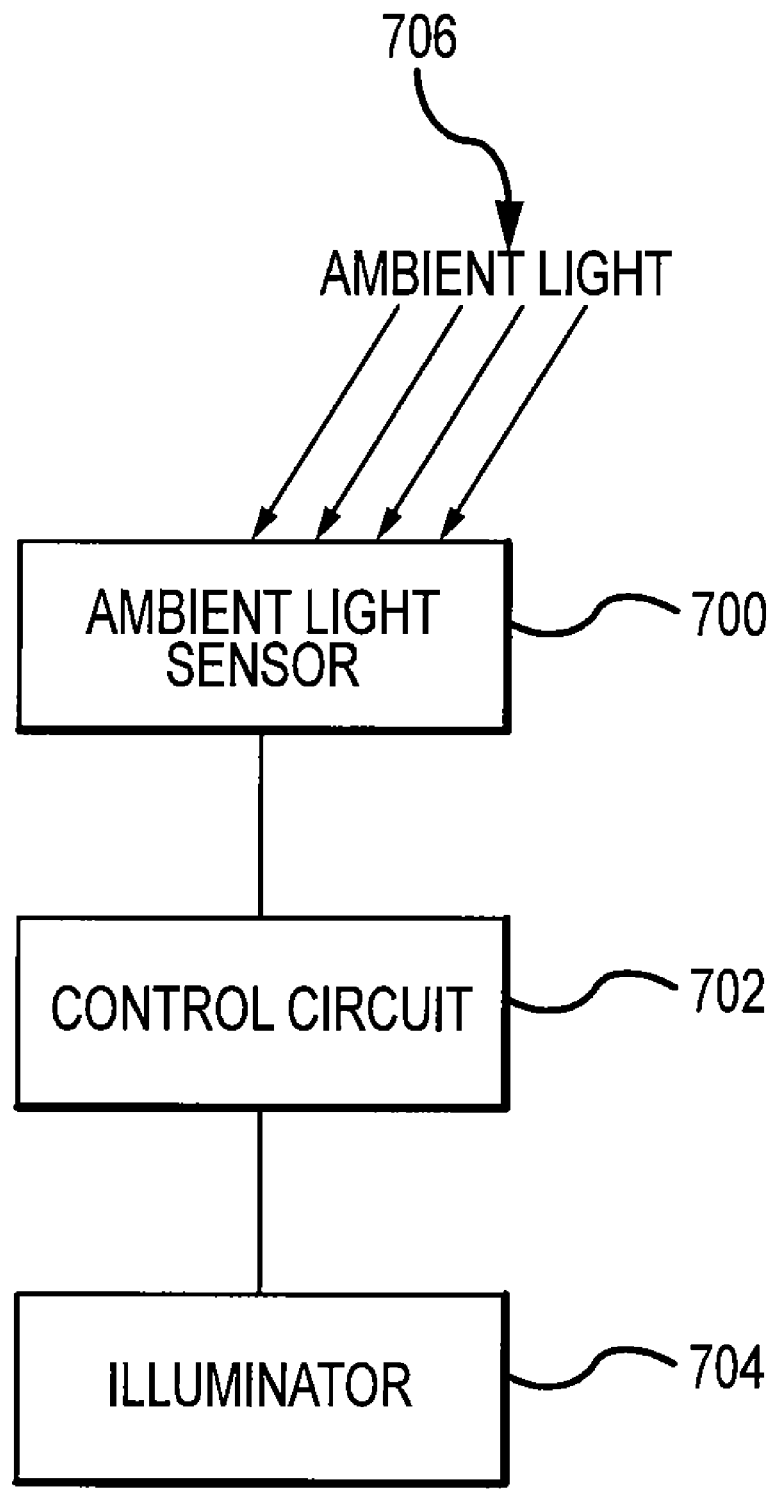
FIG. 7 depicts a block diagram of an apparatus to control the brightness of an illuminator based on ambient light.

FIG. 7 depicts a block diagram of an apparatus to control the brightness of an illuminator based on ambient light. An ALS 700 may detect ambient light 706 of a surrounding area. The ALS 700 may output the detected ambient light level to a control circuit 702. The control circuit 702 may then control the brightness of an illuminator 704 based on the ambient light level output received from the ALS 700. In this manner, the brightness of the illuminator 704 may be adjusted in response to the ambient light 706 in the surrounding area so that the illuminator may provide a uniform appearance under all lighting conditions.

The control circuit 702 may be formed by hardware components or may be embodied in a general-purpose or special-purpose processor, or logic circuits programmed with machine-executable instructions, to perform the controlling of the illuminator 704. Further, control circuit 702 may be embodied within an electronic device also containing the ALS 700 and the illuminator 704.

It should be noted that the flowchart of FIG. 6 is illustrative only. Alternative embodiments of the present invention may add operations, omit operations, or change the order of operations without affecting the spirit and scope of the present invention.

The foregoing merely illustrates certain principles and embodiments of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. As one example, in alternative embodiments the output of the ALS may be scaled downward when the computer is in the open position and the ALS output when the computer is closed may be used as a baseline. As yet another example, the sensitivity of the ALS may likewise be adjusted downward when the computer is in the open position, instead of such functions occurring when the computer is closed. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

The invention claimed is:

1. An apparatus for controlling the brightness of a plurality of illuminators of an electronic device, the electronic device configured to move between an open position and a closed position, the apparatus comprising:
   an ambient light sensor configured on a surface of the electronic device such that the ambient light sensor is exposed when the electronic device is in the open configuration and when the electronic device is in the closed configuration the ambient light sensor is covered; and
   a control circuit operative to receive an output from the ambient light sensor and configured to control the brightness of a first illuminator in response to ambient light when the electronic device is in the open position and the brightness of a second illuminator in response to ambient light when the electronic device is in the closed position, wherein the first illuminator is configured on the surface.

2. The apparatus of claim 1, further comprising:
   a spacer located between a top piece of the electronic device and a bottom piece of the electronic device and at least partially defining a path for at least some ambient light to reach the ambient light sensor when the electronic device is in the closed position.

3. The apparatus of claim 1, further comprising:
   a light pipe configured to channel at least some ambient light to the ambient light sensor when the electronic device is in the closed position.

4. The apparatus of claim 1, further comprising:
   a translucent window permitting ambient light to pass to the ambient light sensor when the electronic device is in the closed position.

5. The apparatus of claim 1 wherein the electronic device chosen from the group comprising: a computer; a mobile telephone; a computer display; a digital music player; a medical or health device; and an auto-mounted device.

6. The apparatus of claim 1, wherein the control circuit is further operative to scale an output from the ambient light sensor when the electronic device is in the closed position.

7. The apparatus of claim 1, wherein the second illuminator is an indicator light.

8. The apparatus of claim 1 wherein the control circuit adjusts the sensitivity of the ambient light sensor when the apparatus is in the closed position.

9. The apparatus of claim 4, wherein:
   the translucent window defines a portion of at least a first edge and second edge of the device;
   the first edge is exposed when the electronic device is in both the open and closed positions; and
   the second edge is exposed only when the electronic device is in the open position.

10. A method for controlling the brightness of at least one illuminator of an electronic device, the electronic device configured to provide an open position and a closed position, the method comprising:
    sensing ambient light using an ambient light sensor configured on a surface of the electronic device such that the ambient light sensor is exposed when the electronic device is in the open configuration and when the electronic device is in the closed configuration the ambient light sensor is covered;

using the output of the ambient light sensor to control the brightness of the at least one illuminator when the electronic device is in the open position;

providing a path for at least some ambient light to reach the ambient light sensor when the electronic device is in the closed position; and adjusting the sensitivity of the ambient light sensor when the electronic device is in the closed position by scaling the output of the ambient light sensor.

11. The method of claim 10, further comprising the operation of providing a spacer located between a top piece of the electronic device and a bottom piece of the electronic device.

12. The method of claim 10, wherein the path comprises a light pipe angled to transmit at least some ambient light from an exterior of the electronic device to the ambient light sensor.

13. The method of claim 10, further comprising the operation of providing a translucent window configured to surround the ambient light sensor.

14. The method of claim 10, wherein the ambient light sensor is hidden from view when the electronic device is in the closed position.

15. A computer system, the computer system configured to provide an open position and a closed position, the computer system comprising:

a display located on an inner surface of the computer system such that the display is exposed when the computer system is in the open configuration and enclosed by the computer system when the computer system is in the closed configuration;

at least a first illuminator located on an outer surface of the computer system; and an ambient light sensor located on the inner surface of the computer system such that the ambient light sensor is exposed when the computer system is in the open configuration and when the computer system is in the closed configuration the ambient light sensor is covered, the ambient light sensor configured to control the brightness of the display when the computer system is in the open position and the brightness of the first illuminator when the computer system is in the closed position.

16. The computer system of claim 15 wherein an output of the ambient light sensor is scaled when the computer system is in the closed position.

17. The computer system of claim 15 further comprising:
a top piece;
a bottom piece; and
at least one spacer located between the top piece and the bottom piece and configured to control the amount of ambient light that reaches the ambient light sensor.

18. The computer system of claim 15 further comprising:
a light pipe configured to control the amount of ambient light that reaches the ambient light sensor.

19. The computer system of claim 15 further comprising:
a translucent window configured to surround the ambient light sensor;
wherein the translucent window controls the amount of ambient light that reaches the ambient light sensor.

20. The computer system of claim 15 wherein the sensitivity of the ambient light sensor is adjusted when the computer system is in the closed position.

* * * * *